US009533912B2

(12) United States Patent
Aitken et al.

(10) Patent No.: US 9,533,912 B2
(45) Date of Patent: Jan. 3, 2017

(54) CHALCOGENIDE GLASS

(75) Inventors: Bruce Gardiner Aitken, Corning, NY (US); Stephen Charles Currie, Corning, NY (US); Randall Eugene Youngman, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/128,713

(22) PCT Filed: Jun. 29, 2012

(86) PCT No.: PCT/US2012/044763
§ 371 (c)(1),
(2), (4) Date: Apr. 9, 2014

(87) PCT Pub. No.: WO2013/006392
PCT Pub. Date: Jan. 10, 2013

(65) Prior Publication Data
US 2015/0038314 A1    Feb. 5, 2015

Related U.S. Application Data

(60) Provisional application No. 61/503,868, filed on Jul. 1, 2011.

(51) Int. Cl.
| | |
|---|---|
| C03C 3/32 | (2006.01) |
| C03C 4/10 | (2006.01) |
| C03B 1/00 | (2006.01) |
| C03B 5/06 | (2006.01) |
| C03B 5/08 | (2006.01) |
| C03C 13/04 | (2006.01) |
| C03B 5/225 | (2006.01) |

(52) U.S. Cl.
CPC ............ *C03C 3/321* (2013.01); *C03B 1/00* (2013.01); *C03B 5/06* (2013.01); *C03B 5/08* (2013.01); *C03C 4/10* (2013.01); *C03B 5/2252* (2013.01); *C03C 13/043* (2013.01); *C03C 2204/00* (2013.01)

(58) Field of Classification Search
CPC .......... C03C 3/321; C03C 4/10; C03C 13/043; C03C 13/044; C03B 1/00; C03B 5/06; C03B 5/08; C03B 5/2252; C03B 2201/62; C03B 2201/70; C03B 2201/78; C03B 2201/86
USPC ........................................................ 501/40
See application file for complete search history.

(56) References Cited

U.S. PATENT DOCUMENTS

| | | | |
|---|---|---|---|
| 4,542,108 A | 9/1985 | Susman et al. | |
| 5,392,376 A | 2/1995 | Aitken et al. | 385/144 |
| 5,599,751 A | 2/1997 | Harbison et al. | 501/40 |
| 6,015,765 A | 1/2000 | Harbison et al. | 501/40 |
| 6,277,775 B1 * | 8/2001 | Aitken | 501/40 |
| 2006/0257097 A1 | 11/2006 | Aitken et al. | 385/147 |
| 2009/0057834 A1 | 3/2009 | Schlueter et al. | 257/613 |

FOREIGN PATENT DOCUMENTS

| | | |
|---|---|---|
| JP | 2007-273214 | 10/2007 |
| RU | 2237029 | 9/2004 |

OTHER PUBLICATIONS

D.R. Bloyer, et al., "Infrared Spectroscopy of Wide Composition Range $xNa_2S+(1-x)B_2S_3$ Glasses", *J. Am. Ceram. Soc.*, 1993, vol. 76, No. 11, pp. 2753-2759.
J. Cho, et al., "Infrared spectroscopy of glasses and polycrystals in the series $xK_2S+(1-x)B_2S_3$", *Journal of Non-Crystalline Solids*, 1995, vol. 182, pp. 248-256.
J.R. Hendrickson, et al., "$^{11}B$ NMR Studies of Glassy $B_2S_3$", *Solid State Communications*, 1975, vol. 17, pp. 301-304.
H.U. Hurter, et al., "Solid-State $^{11}B$ NMR Studies on Boron-Chalcogenide Systems", *Inorganic Chemistry*, 1985, vol. 24, pp. 1288-1292.
S.J. Hwang, et al., "Quantitative study of the short range order in $B_2O_3$ and $B_2S_3$ by MAS and two-dimensional triple-quantum MAS $^{11}B$ NMR", *Solid State Nuclear Magnetic Resonance*, 1997, vol. 8, pp. 109-121.
S.W. Martin, et al., "Preparation of High-Purity Vitreous $B_2S_3$", *J. Am. Ceram. Soc.*, 1990, vol. 73, No. 11, pp. 3481-3485.
Q. Mei, et al., "Preparation and characterization of glasses in the $Ag_2S+B_2S_3+GeS_2$ system", *Journal of Non-Crystalline Solids*, 2003, vol. 324, pp. 264-276.
M. Rubenstein, "Nuclear magnetic resonance and relaxation in vitreous and liquid $B_2O_3$ and $B_2S_3$", *Physical Review B*, Oct. 1, 1976, vol. 14, No. 7, pp. 2778-2786.
J.A. Sills, et al., "$^{11}B$ NMR studies of the short range order in wide composition range $xNa_2S+(1-x)B_2S_3$ glasses", *Journal of Non-Crystalline Solids*, 1994, vol. 168, pp. 86-96.
J.A. Sills, et al., "$^{11}B$ NMR studies of the short range order in $K_2S+B_2S_3$ glasses", *Journal of Non-Crystalline Solids*, 1994, vol. 175, pp. 270-277.
International Search Report and Written Opinion for PCT/US2012/044763.
Machine Translation RU2237029, Sep. 27, 2004.
Machine Translation JP2007-273214, Oct. 18, 2007.
Haynes et al; The Mixed Glass Former Effect on the Thermal and Volume Properties of Na2-B2S3-P2S5 Glasses; Phys. Chem. Glasses: Eur J Glass Sci. Technol. B Jub. 2009, 50 (3), 144-148.
EP12807641.1 Extended Search Report, 2015.

* cited by examiner

*Primary Examiner* — Elizabeth A Bolden
(74) *Attorney, Agent, or Firm* — Zachary J. Wegmann

(57) ABSTRACT

Boron-containing network sulfide glass which may be useful in IR transmitting applications, such as IR optics, laser or fiber amplifiers doped with rare earths with emission in the near IR, and methods of making the same.

21 Claims, 1 Drawing Sheet

CHALCOGENIDE GLASS

This application claims the benefit of priority under 35 U.S.C. §119 of U.S. Provisional Application Ser. No. 61/503868 filed Jul. 1, 2011 the content of which is relied upon and incorporated herein by reference in its entirety.

BACKGROUND

Field

Embodiments relate generally to boron-containing network chalcogenide glass and more particularly to boron-containing network chalcogenide glass which may be useful in IR transmitting applications, such as IR optics, laser or fiber amplifiers doped with rare earths with emission in the near IR, and methods of making the same.

Technical Background

Boron (B) is an extremely useful component of many oxide glasses, including borosilicates, boroaluminosilicates, borophosphates, etc. In the case of silica-containing glasses, B is used as a flux to lower melting/forming temperatures as well as to provide excellent thermal shock resistance through reduced thermal expansion coefficients. In the case of phosphate glasses, B tends to associate with P as a next nearest neighbor, forming coupled $BO_4/PO_4$ tetrahedra, which leads to increased polymerization of the glass network and improved durability of the glass.

Although B could be a useful component in tailoring the properties of chalcogenide glass, e.g. to reduce thermal expansion or perhaps to improve chemical durability, there are few reports of B-containing chalcogenide glass. Most of the B-containing glasses that have been reported to date are B sulfide ($B_2S_3$) and the so-called alkali thioborates, i.e. glasses comprising $B_2S_3$ and an alkali sulfide such as $Na_2S$, all of which are characterized by poor durability. B-containing AgGe sulfide glasses have been described with a passing reference to some unmodified network glasses comprising $B_2S_3$ and $GeS_2$. Save for the latter, there are no literature citations for B-containing network chalcogenide glasses, e.g. glasses based on P, Ga, Ge, As, In Sn and Sb sulfides, selenides or tellurides, other than for pure vitreous $B_2S_3$, presumably due to the fact that such glasses are typically prepared by melting mixtures of the constituent elements within evacuated fused silica vessels. As B is extremely refractory (Melting Point>2000° C.) as well as very reactive with O, it is very slow to dissolve and has a tendency to react with the container walls, thereby introducing Si and/or O into the resultant melt/glass. There is a need to develop B-containing network chalcogenide glasses, for example, B-containing network sulfide, selenide, and selenotelluride glasses and also methods to overcome the latter practical difficulties.

SUMMARY

Embodiments disclose the existence of a glassforming region in the Ge—B—S, Se ,or S+Se; Ge—P—B—S, Se, or S+Se; As—B—S, Se, or S+Se; Ge—As—B—S, Se, or S+Se; and Ge—Ga—B—S, Se or S+Se systems as well as methods by which such glasses can be prepared without significant contamination from Si and/or O.

Significant expansion of the glassforming region of network sulfide glasses, e.g. GeAs sulfide glasses, allows for greater flexibility in tailoring glass properties such as characteristic temperatures (e.g glass transition temperature (Tg)), thermal expansion coefficient, refractive index, etc. that may be important for specific applications. Moreover, whereas B typically assumes 3-fold coordination by S in most sulfide glasses, including $B_2S_3$ and the alkali thioborate glasses mentioned above, we have found that it assumes tetrahedral coordination by S when P is also present, resulting in improved chemical durability as well as increased thermal stability.

One embodiment is a glass comprising in atomic percent:
0-40 Ge;
0-40 As;
0-15 Ga;
0-15 P;
0-40 Te;
greater than 0-25 B; and
55-75 S, Se, or S+Se.

Another embodiment is a method for making a glass, the method comprises:
providing a precursor glass or crystalline material comprising in atomic percent
0-40 Ge,
0-40 As,
0-15 Ga,
0-15 P,
0-40 Te, and
55-75 S, Se, or S+Se;
combining the precursor glass or crystalline material with elemental B; and melting the precursor glass or crystalline material with elemental B to form the glass.

Additional features and advantages will be set forth in the detailed description which follows, and in part will be readily apparent to those skilled in the art from the description or recognized by practicing the invention as described in the written description and claims hereof.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings illustrate one or more embodiment(s) of the invention and together with the description serve to explain the principles and operation of the invention.

BRIEF DESCRIPTION OF DRAWINGS

The invention can be understood from the following detailed description either alone or together with the accompanying drawing figures.

DETAILED DESCRIPTION

Figure 1:
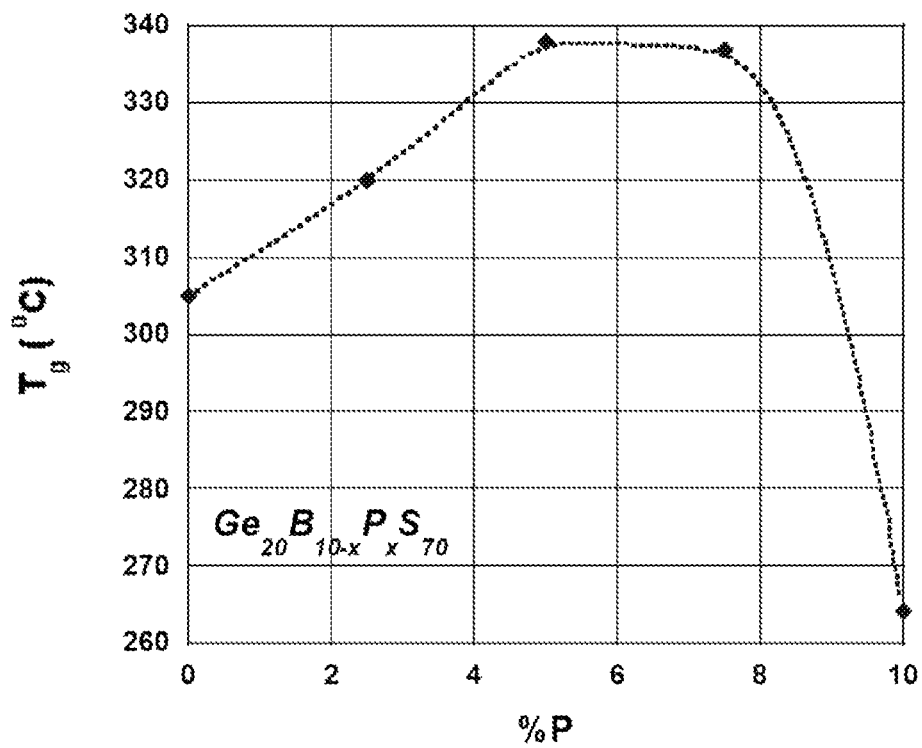
FIG. 1 is a graph showing compositional dependence of Tg for $Ge_{20}B_{10-x}P_xS_{70}$ glasses, wherein x is the atomic percent of P.

Reference will now be made in detail to various embodiments of the invention.

One embodiment is a glass comprising in atomic percent:
0-40 Ge;
0-40 As;
0-15 Ga;
0-15 P;
0-40 Te;
greater than 0-25 B; and
55-75 S, Se, or S+Se.

The glass according to one embodiment, further comprises 0-15 Sn, Sb, or Sn+Sb, for example, greater than 0-15, for example, 0.05-15, for example, 0.5-15, for example, 1-15.

The glass according to one embodiment, further comprises 0-20 alkali metal, alkaline earth metal, rare earth metal, or combinations thereof, for example, Na and/or Ba, for example, greater than 0-20, for example 0.05-20, for example, 0.5-20, for example, 1-20.

The glass according to one embodiment, further comprises 0-15 Tl, Pb, Bi, Sn, or combinations thereof, for example, greater than 0-15, for example, 0.05-15, for example, 0.5-15, for example, 1-15.

In some embodiments, the glass is substantially homogenous. The glass can be substantially oxygen free, for example, free of intentionally added oxygen. Oxygen free is advantageous for maintaining excellent optical properties (e.g. IR transmission), and any oxygen contamination tends to bind with boron, reducing the effectiveness of boron addition to these glasses. In the case of P-containing glasses, oxygen might also find P and reduce durability of the glass. Homogeneous glasses are advantageous for thermal stability and especially optical performance of these materials.

The glass, according to one embodiment, comprises greater than 0-40 percent Ge, for example, 0.05-40, for example, 0.5-40, for example, 1-40. The glass, according to one embodiment, comprises 0-4 percent Ge. The glass, according to one embodiment, comprises 10-15 percent Ge. The glass, according to one embodiment, comprises 24-40 percent Ge.

The glass, according to one embodiment, comprises greater than 0-40 As, for example, 0.05-40, for example, 0.5-40, for example, 1-40.

The glass, according to one embodiment, comprises greater than 0-15 Ga, for example, 0.05-15, for example, 0.5-15, for example, 1-15.

The glass, according to one embodiment, comprises greater than 0-15 P, for example, 0.05-15, for example, 0.5-15, for example, 1-15.

The glass, according to one embodiment, comprises 55-75 S, Se, or S+Se, for example 60-75.

The glass, according to one embodiment, comprises 0-40 Te, for example, greater than 0-40 Te, for example, 0.05-40, for example, 0.5-40, for example, 1-40.

Another embodiment is a method for making a glass, the method comprises:

providing a precursor glass or crystalline material comprising in atomic percent
  0-40 Ge,
  0-40 As,
  0-15 Ga,
  0-15 P,
  0-40 Te, and
  55-75 S, Se, or S+Se;
combining the precursor glass or crystalline material with elemental B; and melting the precursor glass or crystalline material with elemental B to form the glass.

Providing the precursor glass or crystalline material comprises, in one embodiment, forming a powder of the precursor glass or crystalline material. In one embodiment, the melting comprises heating the precursor glass or crystalline material with elemental B in a carbon vessel contained in silica. The vessel can be a carbon crucible contained in an evacuated silica ampoule. A silica ampoule which has been backfilled with an inert gas such as argon, nitrogen, or a combination thereof can also be used. The melting can comprise heating the precursor glass or crystalline material with elemental B in a silicon lined vessel. The vessel can be an evacuated and sealed silicon lined fused silica vessel. The glass made by the methods described herein can comprise in atomic percent:

0-40 Ge;
  0-40 As;
  0-15 Ga;
  0-15 P;
  0-40 Te;
  greater than 0-25 B; and
  55-75 S, Se, or S+Se.

EXAMPLES

Figure 2:
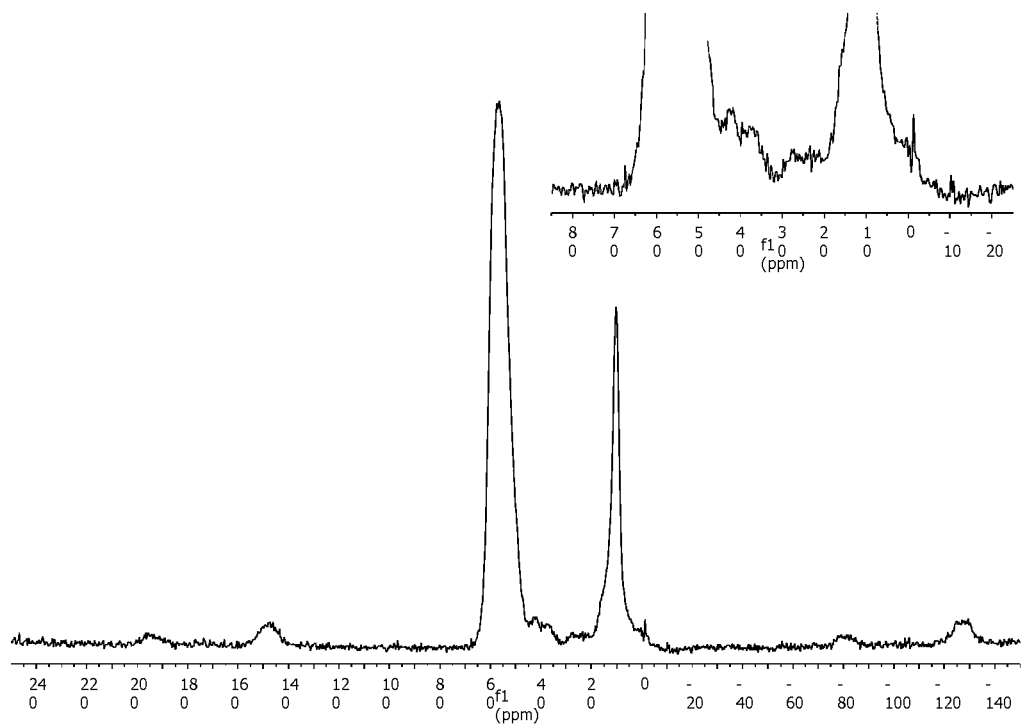
FIG. 2 is an 11 B magic-angle-spinning nuclear magnetic resonance (MAS NMR) spectrum of Example 11 glass ($Ge_{20}B_{2.5}P_{7.5}S_{70}$) in Table 2.

Table 1, Table 2, Table 3, Table 4, Table 5, and Table 6 show exemplary glasses, according to embodiments of the invention where composition is expressed in terms of atomic %. All cited examples are transparent glasses, although their transparency in the visible is limited as noted by the indicated color. Glass transition temperature (Tg) was measured by differential scanning calorimetry. FIG. 1 is a graph showing compositional dependence of Tg for $Ge_{20}B_{10-x}P_xS_{70}$ glasses. The Tg increase from ~305 to ~340° C. as P is substituted for B is due to partial conversion of 3-coordinated B to 4-coordinated B. The presence of the latter species is confirmed by the sharp NMR resonance at 10 ppm, as indicated in FIG. 2. FIG. 2 is an 11 B MAS NMR spectrum of Example 11 ($Ge_{20}B_{2.5}P_{7.5}S_{70}$). The dominant resonance at ~55 ppm is due to 3-coordinated B. The sharp resonance at ~10 ppm indicates the presence of 4-coordinated B, which species is stabilized by the presence of P. The DSC data for Examples 3, 9-11 in the Tables are plotted as a function of composition in FIG. 1 and show that Tg attains a maximum value for a B/P ratio near unity. This behavior is due to the partial conversion of 3- to 4-coordinated B with rising P concentration. The presence of 4-coordinated B in these P-codoped glasses is demonstrated by the sharp resonance at ~10 ppm in the 11 B MAS NMR spectrum of Example 11.

TABLE 1

| Atomic | Example | | | | | | | |
|---|---|---|---|---|---|---|---|---|
| % | 1 | 2 | 3 | 4 | 5 | 6 | 7 | 8 |
| Ge | 27.5 | 25 | 20 | 15 | 35 | 30 | 25 | 20 |
| As | | | | | | | | |
| P | | | | | | | | |
| B | 2.5 | 5 | 10 | 15 | 5 | 10 | 15 | 20 |
| S | 70 | 70 | 70 | 70 | 60 | 60 | 60 | 60 |
| color | yellow | yellow | yellow | yellow | red | red | red | red |
| Tg | 383 | 350 | 305 | 288 | 354 | ~350 | 356 | ~350 |

TABLE 2

| Atomic | Example | | | | | | |
|---|---|---|---|---|---|---|---|
| % | 9 | 10 | 11 | 12 | 13 | 14 | 15 |
| Ge | 20 | 20 | 20 | 8.3 | 7.9 | 7.3 | |
| As | | | | 16.6 | 15.8 | 14.6 | 23.8 |
| P | 2.5 | 5 | 7.5 | | | | |
| B | 7.5 | 5 | 2.5 | 5 | 10 | 16.7 | 5 |
| S | 70 | 70 | 70 | 70.1 | 66.4 | 61.5 | 71.3 |
| color | yellow | yellow | yellow | orange | orange | orange | orange |
| Tg | 320 | 338 | 337 | | | | |

TABLE 3

| Atomic | Example | | | | |
|---|---|---|---|---|---|
| % | 16 | 17 | 18 | 19 | 20 |
| Ge |  |  | 20 | 25.5 | 10 |
| As | 22.5 | 21.3 |  |  |  |
| Ga |  |  |  | 7.4 |  |
| P |  |  | 8.8 |  |  |
| B | 10 | 15 | 1.3 | 5 | 20 |
| S | 67.5 | 63.8 | 70 | 62.1 | 70 |
| color | orange | dk orange | yellow | amber | yellow |
| Tg |  |  |  |  |  |

TABLE 4

| Atomic | Example | | |
|---|---|---|---|
| % | 21 | 22 | 23 |
| Ge | 9.5 | 9.5 | 9.5 |
| As | 19 | 19 | 19 |
| B | 5 | 5 | 5 |
| Se | 59.9 | 53.2 | 33.3 |
| Te | 6.7 | 13.3 | 33.3 |
| color | black | black | black |
| Tg |  |  |  |

TABLE 5

| Atomic | Example | | | | | | | |
|---|---|---|---|---|---|---|---|---|
| % | 24 | 25 | 26 | 27 | 28 | 29 | 30 | 31 |
| Ge |  | 15.8 | 15 | 7 |  |  | 28.5 | 27 |
| As | 28.5 | 15.8 | 15 | 14 | 20 | 18.8 |  |  |
| P |  |  |  |  |  |  |  |  |
| B | 5 | 5 | 10 | 20 | 20 | 25 | 5 | 10 |
| S |  |  |  | 59 | 60 | 56.3 |  |  |
| Se | 66.5 | 63.3 | 60 |  |  |  | 66.5 | 63 |
| Na |  |  |  |  |  |  |  |  |
| color | black | dark red | dark red | orange | orange | orange | dark red | dark red |
| Tg | 155 | 260 | 267 | 267 | 200 | 238 |  |  |

TABLE 6

| Atomic | Example | | | | |
|---|---|---|---|---|---|
| % | 32 | 33 | 34 | 35 | 36 |
| Ge | 20 | 20 | 20 | 20 | 21.4 |
| As |  |  |  |  |  |
| P | 7.5 | 5 | 2.5 |  |  |
| B | 2.5 | 5 | 7.5 | 10 | 11.4 |
| S |  |  |  |  | 62.3 |
| Se | 70 | 70 | 70 | 70 |  |
| Na |  |  |  |  | 5 |
| color | dark red | dark red | dark red | dark red | amber |
| Tg | 250 | 276 | 279 | 270 |  |

Initial experimental attempts to synthesize these glasses used typical chalcogenide glass preparation techniques in which appropriate mixtures of the elements are loaded into a fused silica ampoule. The latter is subsequently evacuated, sealed and then heated in a rocking furnace for at least 24 h prior to quenching the resultant liquid into a glass. When a glass with the composition of example 2 was prepared in this fashion, chemical analysis showed that the resultant material contained 0.75 wt % Si, indicating significant reaction between the batch and the wall of the fused silica ampoule. Moreover, the analyzed B/Ge ratio was found to be 0.11, considerably less than the nominal value of 0.20, indicating incomplete dissolution of B in the glass.

In order to overcome the slow B dissolution kinetics, a novel batch consisting of a mixture of elemental B and ground, premelted glass comprising the remainder of the composition was used. For example, in the case of the 25Ge:5B:70S composition of Example 2, a 26.32Ge:73.685 glass was first prepared. After grinding into powder, 19.738 g of this glass was mixed with 0.263 g B. Then, in order to eliminate reaction between B and the silica ampoule, this batch was loaded into a vitreous C crucible that had been previously inserted into a silica ampoule. The latter was then evacuated and sealed as above, and then heated in a vertical furnace for 3 h at 900° C. Chemical analysis of the resultant clear yellow glass showed the presence of only 0.15 wt % Si and the B/Ge ratio to be 0.18, i.e. very close to the nominal value of 0.20.

We have since also obtained similar results using the same glass+B batch and melting this in a fused silica ampoule whose walls had been coated with a thin Si film.

The above methods have also proved effective in dealing with B-containing As sulfide, GeAs sulfide as well as GeGa sulfide compositions. In the former case, a batch with the nominal composition of $As_{25}B_5S_{70}$, i.e. very similar to that of Example 15 ($As_{23.75}B_5S_{71.25}$), was used to prepare a glass by conventional methods. The resultant material, although glassy, was translucent due to the presence of much undissolved B powder in suspension. However, when Example 15 was made in a vitreous C crucible using elemental boron plus premelted $As_{25}S_{75}$ glass powder as the As and S source for the batch, the resultant material was a transparent orange glass.

There are advantages to the glass by virtue of the methods used to make the glass in that the described methods greatly reduce the level of oxygen contamination experienced by other methods. Thus the composition of the described glasses are much closer to the nominal composition and are also more homogeneous. If oxygen is intentionally added (as opposed to being incorporated as an impurity or as a byproduct of the synthesis procedure), at some point this results in phase separation.

A B-free version of Example 19 in Table 3, i.e. the base GeGa sulfide was melted and required rapid quenching in order to avoid crystallization. However, the B-containing version, Example 19, can be cooled slowly without showing signs of crystallization. So, at least in this instance, one of the benefits of adding B is stabilization of the glass against devitrification.

Embodiments of the glass described herein are useful for IR transmitting applications, such as IR optics, laser or fiber amplifiers doped with rare earths with emission in the near IR. In such applications they could be regarded as being advantaged on account of their relatively good transparency in the visible as well, particularly the glasses denoted as being yellow, with next best being those designated as orange.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A glass consisting essentially of, in atomic percent:
   0-40 Ge;
   0-40 As, Sb, or As+Sb;

0-15 Ga, In, or Ga+In;
0 P;
0-40 Te;
greater than 0 B, in an amount up to 20;
50-85 S, Se, or S+Se;
0-15 Tl, Pb, Bi, Sn, or combinations thereof; and
0-20 of an alkali metal, alkaline earth metal, rare earth metal, or combinations thereof,
wherein an amount of B or Ge+B included in the glass is non-stoichiometric with respect to an amount of S, Se, or S+Se included in the glass.

2. The glass according to claim 1, wherein the glass is substantially homogenous.

3. The glass according to claim 1, wherein the glass is substantially oxygen free.

4. The glass according to claim 1, wherein the Tl, Pb, Bi, Sn, or combination thereof is present in an amount ranging from 0.05-15 atomic percent of Tl, Pb, Bi, Sn, or combinations thereof.

5. The glass according to claim 1, wherein the alkali metal, alkaline earth metal, rare earth metal, or combination thereof is present in an amount ranging from 0.05-20 atomic percent of an alkali metal, alkaline earth metal, rare earth metal, or combinations thereof.

6. The glass according to claim 1, comprising 0.05-4 atomic percent Ge.

7. The glass according to claim 1, comprising 10-15 percent Ge.

8. The glass according to claim 1, comprising 24-40 percent Ge.

9. The glass according to claim 1, consisting essentially of, in atomic percent:
greater than 0 Ge, in an amount up to 40;
greater than 0 B, in an amount up to 20; and
50-85 S, Se, or S+Se.

10. The glass according to claim 1, consisting essentially of, in atomic percent:
greater than 0 Ge, in an amount up to 40;
greater than 0 As, in an amount up to 40;
greater than 0 B, in an amount up to 20; and
50-85 Se, or S+Se.

11. The glass according to claim 1, consisting essentially of, in atomic percent:
greater than 0 Ge, in an amount up to 40;
greater than 0 Ga, in an amount up to 15;
greater than 0 B, in an amount up to 20; and
50-85 S, Se, or S+Se.

12. The glass according to claim 1, consisting essentially of, in atomic percent:
greater than 0 Ge, in an amount up to 40;
greater than 0 B, in an amount up to 20; and
50-85 S, Se, or S+Se.

13. A method for making a glass, the method comprising:
providing a precursor glass or crystalline material comprising in atomic percent
0-40 Ge;
0-40 As, Sb, or As+Sb;
0-15 Ga, In, or Ga+In;
0-15 P;
0-40 Te;
greater than 0 B, in an amount up to 25; and
50-85 S, Se, or S+Se
combining the precursor glass or crystalline material with elemental B; and
melting the precursor glass or crystalline material with elemental B to form the glass.

14. The method according to claim 13, wherein the providing the precursor glass or crystalline material comprises forming a powder of the precursor glass or crystalline material.

15. The method according to claim 13, wherein the melting comprises heating the precursor glass or crystalline material with elemental B in a carbon vessel contained in silica.

16. The method according to claim 15, wherein the vessel is a carbon crucible contained in an evacuated silica ampoule.

17. The method according to claim 13, wherein the melting comprises heating the precursor glass or crystalline material with elemental B in a silica ampoule comprising an inert gas.

18. The method according to claim 13, wherein the melting comprises heating the precursor glass or crystalline material with elemental B in a silicon lined vessel.

19. The method according to claim 18, wherein the vessel is a silicon lined fused silica vessel.

20. The method according to claim 13, wherein the glass comprises in atomic percent:
0-40 Ge;
0-40 As;
0-15 Ga;
0-15 P;
0-40 Te;
greater than 0 B, in an amount up to 25; and
55-75 S, Se, or S+Se.

21. A glass consisting essentially of, in atomic percent:
0 Ge;
greater than 0 As, Sb, or As+Sb in an amount up to 40;
0-15 Ga, In, or Ga+In;
0 P;
0-40 Te;
greater than 0 B, in an amount up to 25;
50-85 S, Se, or S+Se;
0-15 Tl, Pb, Bi, Sn, or combinations thereof; and
0-20 of an alkali metal, alkaline earth metal, rare earth metal, or combinations thereof,
wherein an amount of B+(As, Sb, or As+Sb) included in the glass is non-stoichiometric with respect to an amount of S, Se, or S+Se included in the glass.

* * * * *